United States Patent [19]

Fidrych

[11] 4,368,910

[45] Jan. 18, 1983

[54] GRIP FOR PULLING FIBER OPTIC CABLE AND METHOD OF INSERTING THE CABLE INTO THE GRIP

[75] Inventor: Alfred W. Fidrych, Stonington, Conn.

[73] Assignee: Harvey Hubbell Incorporated, Orange, Conn.

[21] Appl. No.: 213,856

[22] Filed: Dec. 8, 1980

[51] Int. Cl.³ ............................................... F16L 3/00
[52] U.S. Cl. .............................. 294/86 CG; 24/115 N; 248/60
[58] Field of Search ............. 294/78 R, 86 R, 86 CG, 294/86.1, 86.26; 24/115 R, 115 A, 115 H, 115 N; 29/283; 248/60; 285/235, 236, 305; 403/43, 291, 373

[56] References Cited

U.S. PATENT DOCUMENTS

| | | | |
|---|---|---|---|
| 1,686,250 | 10/1928 | Page | 24/115 N |
| 1,807,993 | 6/1931 | Martin . | |
| 1,994,674 | 3/1935 | Van Inwagen, Jr. | 24/113 |
| 2,017,625 | 10/1935 | Kellems | 294/86 CG |
| 2,112,281 | 3/1938 | Ferris | 24/123 |
| 2,602,207 | 7/1952 | Kellems | 24/123 |
| 2,698,150 | 12/1954 | Di Palma | 24/115 N X |
| 2,740,178 | 4/1956 | Kellems | 294/86 CG |
| 2,766,501 | 10/1956 | Kellems | 24/123 |
| 3,343,231 | 9/1967 | Clay | 24/115 N |
| 3,431,947 | 3/1969 | Hines | 24/115 N X |
| 3,551,959 | 1/1971 | Mastalski | 24/123 |
| 4,055,875 | 11/1977 | Strickland | 24/115 N X |

OTHER PUBLICATIONS

Kellems catalog, Apr. 1, 1977, p. 27, Dua-Pull Feed Tube and assembly instructions therefor.

*Primary Examiner*—Johnny D. Cherry
*Attorney, Agent, or Firm*—Jerry M. Presson

[57] ABSTRACT

A grip for pulling cable, especially fragile cable such as fiber optic cable. The grip can pull such fragile cable with or without a fragile connector at the end thereof. The grip comprises a rigid, hollow protective sheath with an open tail end for receiving the cable end therein, a pulling device coupled at the lead end of the sheath, and a braided open wire mesh sleeve coupled at the tail end of the sheath for engaging the cable upon a longitudinal stretching thereof which radially reduces the sleeve around the cable. The pulling device can be a flexible wire loop rotatably coupled to the protective sheath. The open wire mesh sleeve can be closed along its length, split along its length or both closed and split in the two sections along its length. A method of inserting the fragile cable with a fragile connector at the end includes the steps of inserting a hollow rigid tube into the sleeve, inserting the fragile connector into the tube, removing the tube from the sleeve, maneuvering the connector into the protective sheath and radially reducing the sleeve by stretching.

19 Claims, 13 Drawing Figures

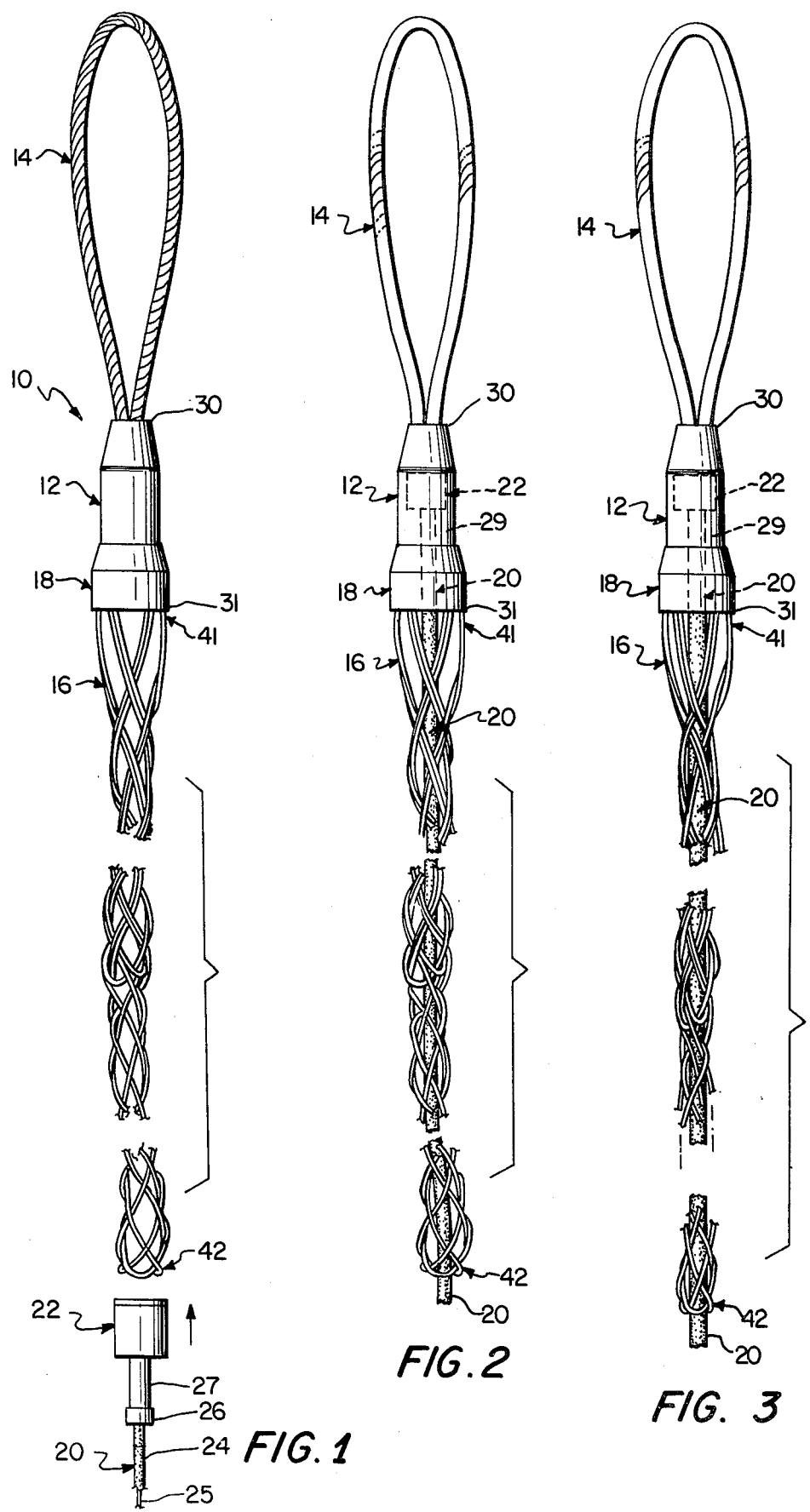

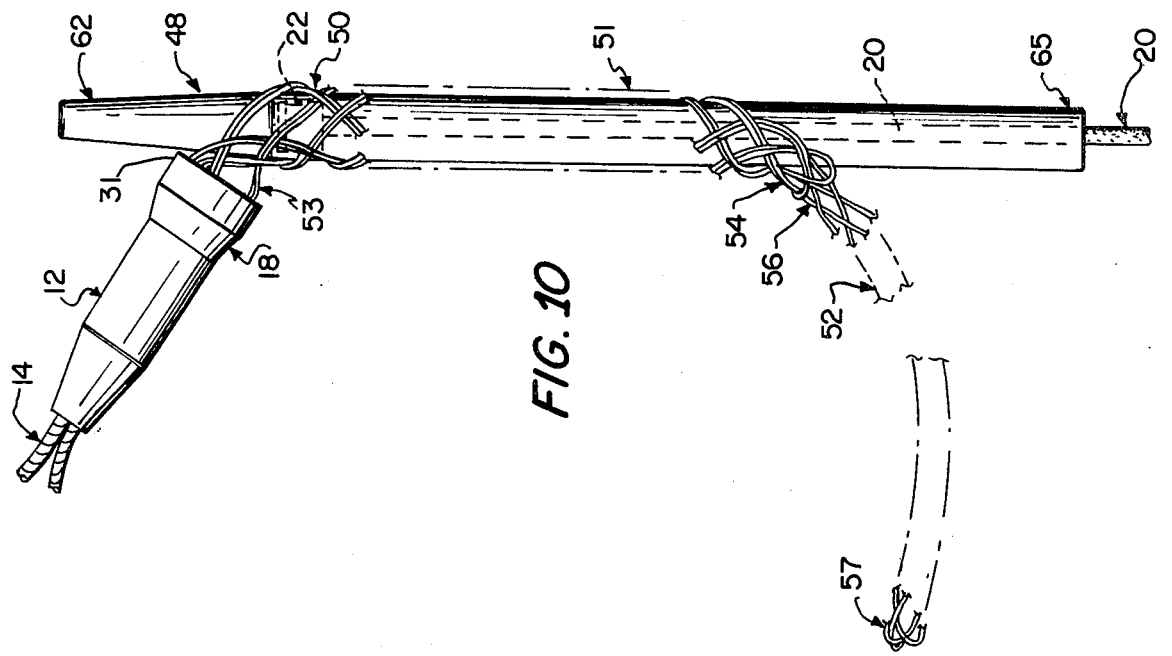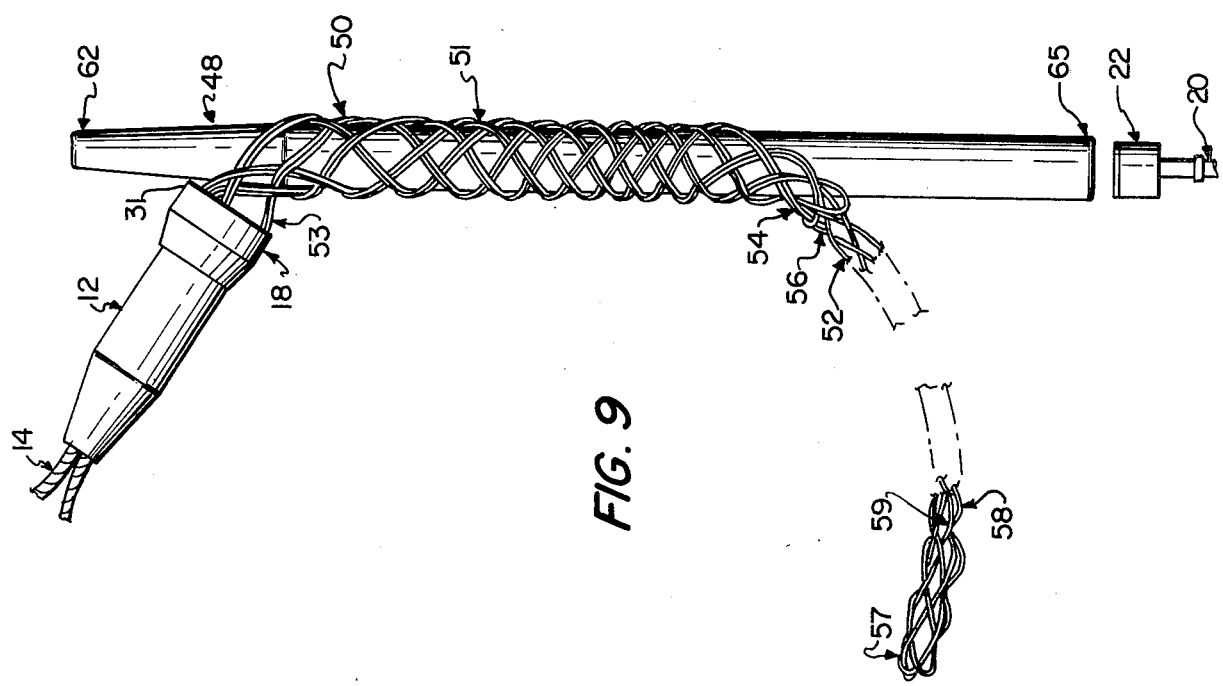

GRIP FOR PULLING FIBER OPTIC CABLE AND METHOD OF INSERTING THE CABLE INTO THE GRIP

FIELD OF THE INVENTION

The present invention relates to a grip for pulling cable, especially fragile cable such as fiber optic cable. The grip can pull such fragile cable with or without a fragile connector at the end thereof. The grip includes a rigid, hollow protective sheath, a pulling device coupled at the lead end of the sheath and a braided open wire mesh sleeve coupled at the tail end of the sheath. A method of inserting the fragile cable with a fragile connector at the end into the grip is also disclosed utilizing a rigid, hollow feed tube insertable into the mesh sleeve.

BACKGROUND OF THE INVENTION

Cable grips for drawing, holding and supporting electrical cables are well known in the art. These devices include a braided open wire mesh sleeve formed from interwoven metallic wire strands which may be expanded radially by longitudinal compression to enable them to readily receive the cable and radially contracted by longitudinal stretching to frictionally engage the periphery of the cable. Subsequently applied forces tending to separate the grip from the cable or to move the grip along the cable cause a firmer grip on the cable.

Examples of these prior art devices are disclosed in the following U.S. Pat. No. 1,807,993 to Martin; U.S. Pat. No.1,994,674 to Van Inwagen, Jr.; U.S. Pat. No. 2,112,281 to Ferris; U.S. Pat. No. 2,602,207 to Kellems; U.S. Pat. No. 2,766,501 to Kellems; and U.S. Pat. No. 3,551,959 to Mastalski.

Such devices are suitable for the fairly rugged electrical cable, but significant problems arise when the cable to be pulled is fragile. An example is fiber optic cable which comprises a flexible jacket encasing a single optical fiber or a bundle of optical fibers therein. Such fragile cable can be easily crushed or its optical characteristics can be distorted if the radial compressive forces on the cable are localized and become too great. Also, the optical fiber can be easily broken when subjected to excessive bending forces. In addition, it is typical to have pre-assembled on the end of fiber optic cable a fragile optical connector receiving one or a bundle of optical fibers therein and secured by epoxy and a crimp. Once again, this fragile connector is highly susceptible to crushing radial compressive forces as well as longitudinal tension forces which could easily snap the connector from the cable.

Moreover, fiber optic cable is much smaller in diameter than the typical electrical cable. These small diameters in most cases are much less than the conventional wire mesh grips can adequately hold. Also, the fiber optic connector at the end of the fiber optic cable has a much larger outside diameter than the cable so that a conventional grip selected to fit and adequately grip the cable cannot expand enough to accept the larger connector diameter. Conversely, a grip designed to receive the large diameter connector cannot compress enough to grip the smaller cable diameter. A typical example is a connector with a 0.5 inch outer diameter and a cable with a 0.073 inch outer diameter.

A method presently used to protect a fiber optic cable connector during pulling comprises wrapping the connector in a layer of foam rubber and then inserting this into a plastic sleeve which in turn is inserted into an oversized wire mesh grip. This method, however, is expensive and time consuming since conventional wire mesh grips are relatively stiff, thereby creating extreme difficulty in inserting the small and flexible cable with a connector attached. In addition, after assembly of this combination, the holding capability of the oversized wire mesh is marginal and may allow slippage of the cable and pull out of the pre-assembled connector.

In addition to these problems, a grip for pulling fiber optic cable must adequately grip the cable, accept any pre-assembled connectors, and not damage the cable or the connector during installation and pulling. There are four basic cable conditions that must be contended with. The first is a cable by itself, containing one or a plurality of optical fibers, or plural cables all without preassembled connectors. This provides only one rather uniform diameter for the grip to contend with.

A second condition comprises a single fiber optic cable with a pre-assembled connector, with both the cable and the connector diameter being within the grip diameter range so that the grip can be compressed longitudinally and therefore expand sufficiently in the radial direction to accept the combined cable and connector and also then be stretched longitudinally to thereby reduce the radius of the wire mesh into a sufficient gripping engagement of the cable.

A third cable condition comprises a single fiber optic cable with a pre-assembled connector where the connector size is beyond the expansion of the wire mesh that is made to suit the cable diameter.

Finally, the fourth basic cable condition comprises a plurality of fiber optic cables with pre-installed connectors where the connector diameter build-up is beyond the expansion capability of the wire mesh.

SUMMARY

Accordingly, a primary object of the present invention is to provide a grip for pulling fragile cable with or without fragile connectors at the ends thereof, whether a single or a plurality of cables and connectors are involved.

Another object of the present invention is to provide a grip for pulling fragile cable such as fiber optic cable with or without a fiber optic connector at the end thereof.

Another object of the present invention is to provide such a grip that protects the end of the fragile cable including the fragile connector located thereon, that can adequately grip the cable without crushing the cable itself and that is simple to manufacture and use.

Another object of the present invention is to provide an easy method for inserting a fragile cable with a fragile connector at the end thereon into a grip for pulling such cable and connector.

Another object of the present invention is to provide a series of grips for pulling fragile cable which can handle various numbers of such cable with or without fragile connectors.

The foregoing objects are basically attained by providing a grip for pulling fragile cable comprising a hollow protective sheath having a lead end and a tail end, the tail end being open for the reception of the fragile cable therein; a pulling device; means for coupling the pulling device to the lead end of the protective sheath; a braided wire mesh sleeve having a lead end and a tail end; and means for rigidly coupling the lead end of the wire mesh sleeve to the protective sheath, the fragile cable being received in and gripped by the wire mesh sleeve.

Advantageously, the protective sheath is formed as a hollow metallic tube with a tapered end which can act as a lead for creating an opening for the fiber optic cable when being pulled through a conduit containing a number of existing cables. The pulling device is a flexible wire loop rotatably connected at the tapered lead end of the sheath.

Since the end of the fragile cable with or without a fragile connector can be safely located inside the protective sheath, the end of the cable is not easily broken during the pulling operation. In addition, since the pulling device can be rotatably connected to the sheath, torsional loads on the fragile cable are reduced during the pulling operation, thereby decreasing the chance that the fragile cable will be damaged or actually break.

Various different types of braided wire mesh sleeves can be utilized with the protective sheath to accommodate a wide range of conditions. In each of these, the wire mesh sleeve is long and has a small expanded diameter so that the cable is not readily crushed.

Utilizing a closed wire mesh sleeve a single fragile cable with or without a fragile connector at the end can easily be gripped, as long as the fragile connector diameter is within the expandable range of the wire mesh sleeve.

Utilizing a wire mesh sleeve that is split throughout its length, a plurality of cables with fragile connectors can be gripped even if the accumulated diameter thereof is greater than the expansion range of the sleeve were it not split.

In addition, a sleeve having a closed section connected to a split section can receive a cable with a connector at the end where the connector diameter is beyond the expansion diameter of the sleeve which is made to suit the diameter of the cable. Such a sleeve having a closed section and a split section is also advantageously usable with cables less than three-sixteen inch in diameter.

Other objects, advantages and salient features of the present invention will become apparent from the following detailed description which, taken in conjunction with the annexed drawings, discloses preferred embodiments of the present invention.

DRAWINGS

Referring now to the drawings which form a part of this original disclosure:

FIG. 1 is an elevational view of the grip in accordance with the present invention with a closed sleeve about to receive a fragile cable having a fragile connector at the end thereof;

FIG. 2 is an elevational view similar to that shown in FIG. 1 except that the connector is received in the protective sheath and the cable in the wire mesh sleeve of the grip;

FIG. 3 is an elevational view similar to that shown in FIG. 2 except that the wire mesh sleeve has been longitudinally stretched and therefore radially compressed about the fragile cable;

FIG. 9 is an elevational view of a further modified grip in accordance with the present invention having a wire mesh sleeve including a closed section and a split section with the feed tube received in the closed section and the fragile cable about to be inserted into the feed tube;

FIG. 10 is an elevational view similar to that shown in FIG. 9 except that the fragile cable is received in the feed tube;

Figure 11:
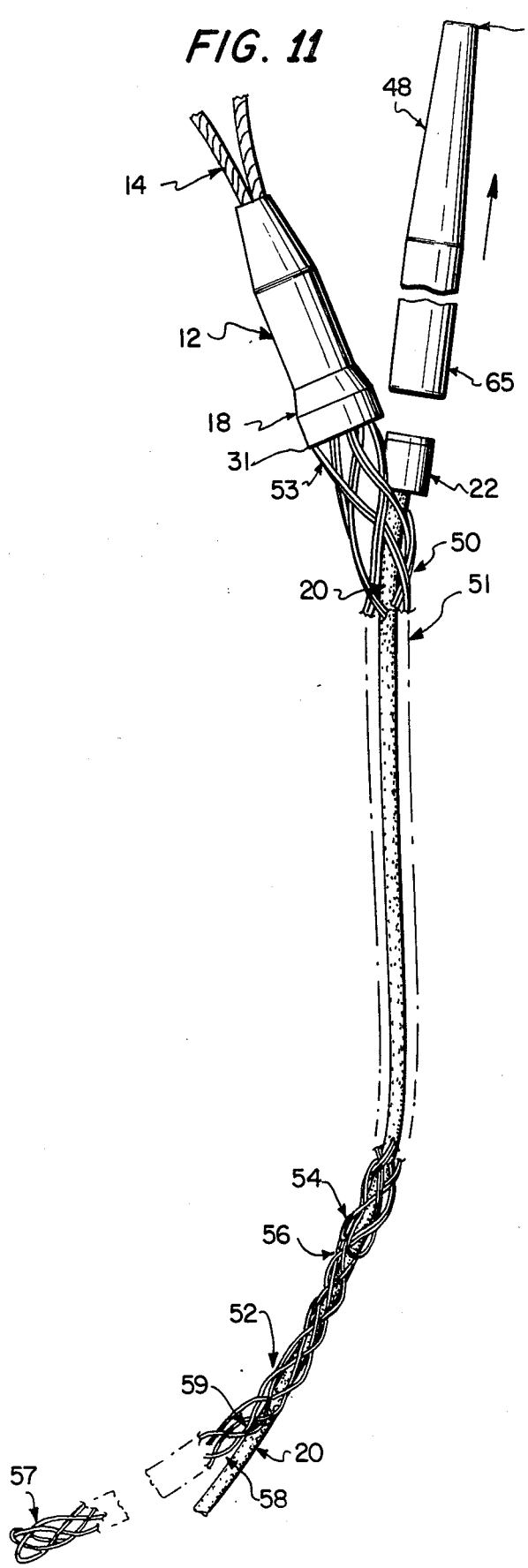
FIG. 11 is an elevational view similar to that shown in FIG. 10 except that the feed tube has been removed from the wire mesh sleeve leaving the fragile cable therein with the fragile connector thereon adjacent the protective sheath.
Figure 12:
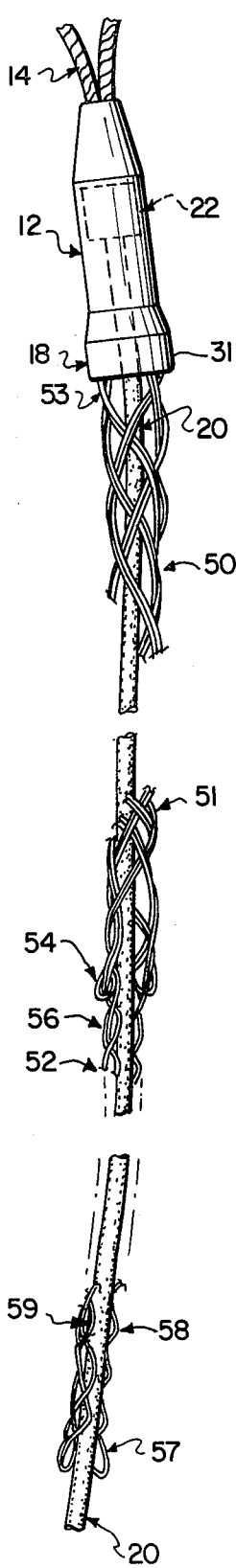
Figure 13:
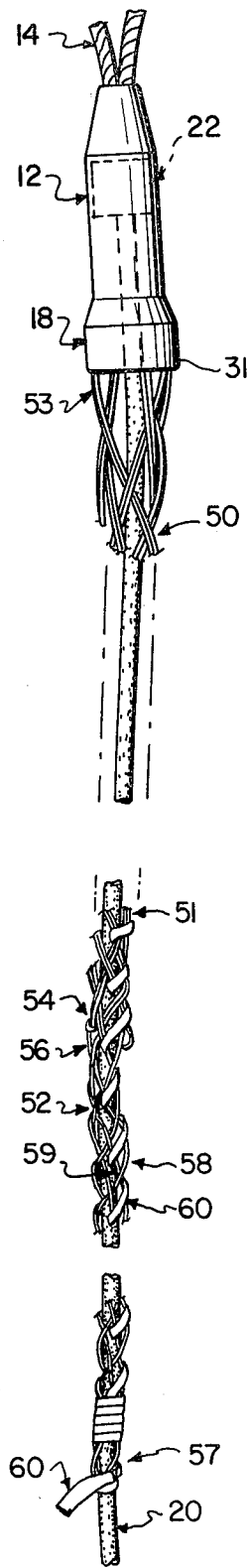

FIG. 12 is an elevational view similar to that shown in FIG. 11 except that the fragile connector has been maneuvered into the protective sheath and the split section of the wire mesh sleeve has been placed around the fragile cable; and FIG. 13 is an elevational view similar to that shown in FIG. 12 except that the split section of the wire mesh sleeve has been laced closed and longitudinally stretched, thereby being reduced in diameter into a gripping engagement with the fragile cable.

DETAILED DESCRIPTION OF THE INVENTION

As seen in FIGS. 1-4, the grip 10 in accordance with the present invention comprises a protective sheath 12, a pulling device 14 coupled to the sheath, and a braided open wire mesh sleeve 16 rigidly coupled to the protective sheath 12 by a collar 18.

The wire mesh sleeve 16 is formed from a plurality of interwoven metallic wire strands and is completely closed along its length as seen in FIG. 1. When the sleeve is longitudinally, i.e., axially, compressed it increases in size radially to receive the fragile cable 20 with the fragile connector 22 at the end thereof. Once suitably received therein, the sleeve 16 can be axially stretched which results in a reduction of its size radially into a gripping action on the fragile cable.

As seen in FIG. 1, the fragile cable 20 can be, for example, a fiber optic cable comprising a flexible, resilient jacket 24 encasing a plurality or bundle of optical fibers 25. The fragile connector 22 is basically a cylindrical member having an internal cylindrical bore for receiving the optical fibers 25 therein, these fibers typically being secured thereto by epoxy as wel as a crimp 26 surrounding a short fragile tube 27 extending from the main cylindrical member of the connector 22.

Figure 4:
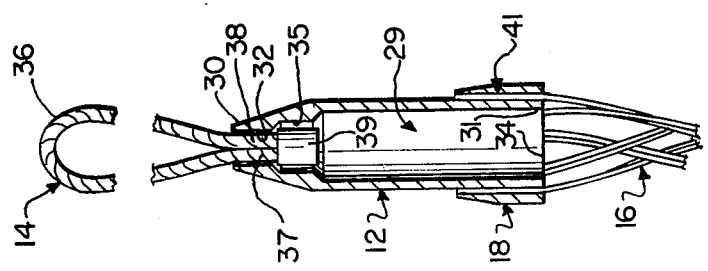
FIG. 4 is a longitudinal cross-sectional view of the grip shown in FIG. 1.

As seen in FIGS. 1 and 4, the protective sheath 12 is comprised of a rigid, hollow continuous tube in the form of a wall or body portion of circular cross section having a substantially cylindrical unobstructed interior chamber 29 with a lead or draft end 30 and a tail end 31. The lead end is tapered and has an axial, cylindrical lead opening 32, the tail end or nose portion 31 having a tail opening 34. Axially aligned with the lead opening 32 is an interior cylindrical cavity 35 communicating with the cylindrical lead opening 32. Advantageously, the entire structure of the protective sheath is formed from a rigid metal with a smooth exterior surface and a smooth interior surface.

The pulling device 14 is comprised of a flexible wire loop 36 having two distal ends 37 and 38 received in a cylindrical axial bore in a cylindrical lug 39, the lug and the two ends being rigidly coupled such as by swaging. The cylindrical lug 39 is received in the cylindrical cavity 35 for rotatable motion so that the pulling device 14 can swivel relative to the protective sheath 12. The top of the lug 39 contacts that portion of the lead end 30 of the protective sheath 12 surrounding the smaller cylindrical lead opening 32 so the lug 39 cannot be pulled from the sheath 12. The ends of the wire loop 36 extend from the lug 39 out of the protective sheath 12 via lead opening 32. Advantageously, in order to construct the pulling device 14 as seen in FIG. 4, the wire loop 36 is bent into the looped condition and the ends 37 and 38 are maneuvered through the lead opening 32 at which time the lug 39 receives the ends 37 and 38 and the ends and the lug are subjected to swaging. The wire loop 36 can have any desired length and is preferably one and one-half to two times the longitudinal length of the protective sheath 12.

As seen in FIGS. 1 and 4, the wire mesh sleeve 16 has a lead end 41 and a tail end 42, the lead end 41 thereof being concentrically positioned around the exterior surface of the protective sheath 12 adjacent the tail end 31 thereof and then is rigidly secured to the sheath by collar 18 being received around the outside of the sleeve lead end 41, the sleeve being interposed between the exterior surface of the sheath and the interior surface of the collar. Advantageously, the collar rigidly couples the sleeve to the sheath by means of a swaging operation. Advantageously, as seen in FIGS. 1-4, the upper part of the sleeve is double braided and the lower part, extending from and being integral with the upper part, is single braided.

As seen in the series of FIGS. 1-3, the fragile cable 20 and the fragile connector 22 on the end thereof are inserted into the grip 10 by first axially compressing the sleeve 16 so that the cable and connector can pass therein. Once the sleeve is so radially expanded by the axial compression, the fragile connector 22 is maneuvered completely along the inside of the sleeve 16 past the lead end 41 of the sleeve and into the internal cylindrical chamber 29 of the protective sheath 12, which has an internal diameter sufficient for the reception of such a connector as seen in FIG. 2. To secure the connector 22 in that position and the cable 20 to the grip, the sleeve 16 is axially stretched and thereby radially compressed into a gripping engagement with the jacket on the cable 20. This is shown in FIG. 3. The combined grip and cable can now be pulled as desired with, for example, a pulling wire or line being connected to the wire loop pulling device 14. Once the combined grip 10 and cable 20 are pulled to their desired location, the sleeve 16 is axially compressed so as to be radially expanded and the cable and connector are removed from the sheath and sleeve. The method of insertion of the cable and connector can be the same as described in detail below regarding FIGS. 7-13. In addition to receiving a single cable with a connector at the end, the embodiment of FIGS. 1-4 can receive merely a single cable without a connector or a plurality of cables with or without connectors, as long as the diameter range of the sleeve is appropriately chosen.

EMBODIMENT OF FIGS. 5-6

Figure 6:
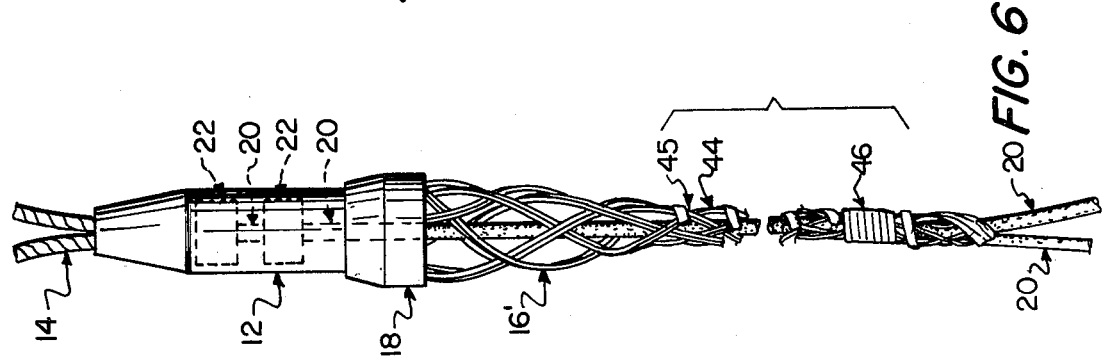
FIG. 6 is an elevational view similar to that shown in FIG. 5 but with a plurality of fragile cables having fragile connectors at the ends thereof received in the protective sheath with the split sleeve having been laced closed.
Figure 5:
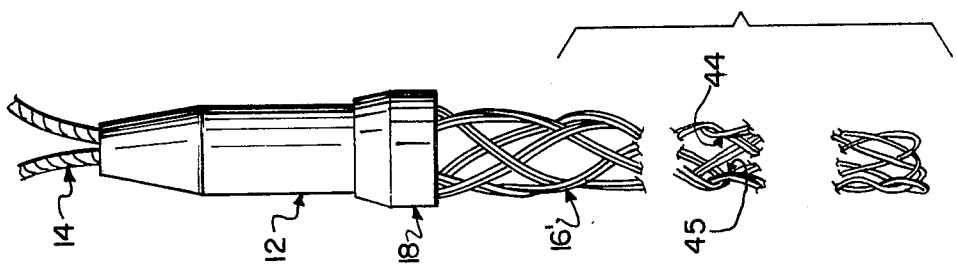
FIG. 5 is an elevational view of a modified grip having a wire mesh sleeve that is split along its length.

The embodiment of the present invention shown in FIGS. 5 and 6 is the same as that shown in FIGS. 1-4 and described above except that the sleeve 16' is split throughout substantially its entire length, having a series of opposed loops 44 and 45 defining the split in the sleeve. This embodiment is advantageously used for a plurality of cables with a plurality of connectors at the end thereof which are beyond the regular expansion diameter of a closed sleeve. The split could also extend up to collar 18.

As seen in FIG. 6, a plurality of fragile cables 20 and connectors 22 can be maneuvered into the hollow sheath 12 via the tail opening 34 and received therein, the split sleeve 16' being wrapped around the cables 20 extending from the sheath 12 and being closed, for example, by lace 46 lacing up the opposed series of loops 44 and 45 defining the opposed edges of the slit in the sleeve. After the lacing is accomplished, the sleeve 16' can be axially stretched which results in a radial compression thereof into a gripping engagement with the cables 20 received therein. The lace 46 can be of any suitable material such as a flat braided polyester and is advantageously laced by using a conventional lacing needle. The sleeve 16' is partly double braided and partly single braided. The two connectors 22, as shown in FIG. 6, are received in the hollow sheath 12 one behind the other. With suitable connector and sheath dimensions, the connectors can also be received in the hollow sheath in a side by side configuration.

EMBODIMENT OF FIGS. 7-13

Figure 8:
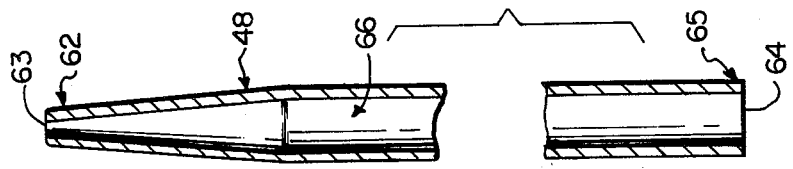
FIG. 8 is a longitudinal sectional view of the feed tube shown in FIG. 7 taken along lines 8—8.
Figure 7:
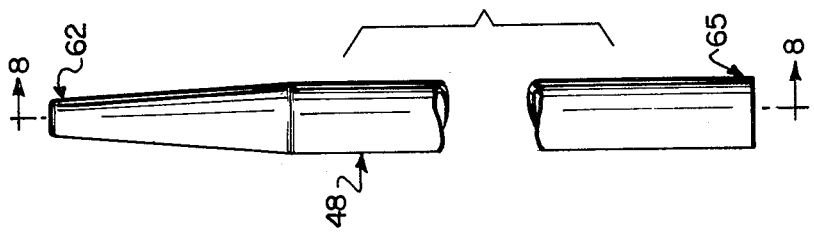
FIG. 7 is an elevational view of a feed tube used to insert a fragile cable having a fragile connector at the end thereof into the grip in accordance with the present invention.

The feed tube 48 shown in FIGS. 7 and 8 is used in conjunction with the grip shown in the embodiment of FIGS. 9-13. The grip shown therein is the same as that described above and shown in FIGS. 1-4 except that the sleeve 50 comprises a closed double braided section 51 and a split single braided section 52, which are integrally braided together.

As seen in FIG. 9, the closed section 51 has a lead end 53 rigidly coupled to the protective sheath 12 via collar 18 and has an open tail end 54. The split section 52 of sleeve 50 has a lead end 56 which merges into the tail end 54 of the closed section 51 and a tail end 57. A series of loops 58 and 59 on the split section 52 define the opposed sides of the split thereof. These series of loops are ultimately connected so as to close the slit by means of lace 60 seen in FIG. 13.

Referring now to FIGS. 7 and 8, the feed tube 48 is rigid and hollow being substantially cylindrical along most of its length and having an inwardly tapered lead end 62 with a lead opening 63 and a tail opening 64 at the tail end 65. The interior of the hollow feed tube defines a chamber 66 for the reception of the fragile connector 22 and a portion of the fragile cable 20 as seen in FIG. 10. Thus, the internal diameter of the chamber 66 should be larger than the exterior diameter of the fragile connector 22, except for the tapered lead end which tapers internally to prevent the connector from moving completely through the tube. The exterior of the tube is smooth.

METHOD OF INSERTION

Referring now to FIG. 9, the method of inserting the fragile cable 20 with the fragile connector 22 at the end thereof into the grip is initiated by inserting the hollow rigid feed tube 48 into the sleeve 50 by inserting the lead end 62 of the tube into the tail end 54 of the closed section 51. The feed tube is then moved along the inside of the sleeve and the end thereof is passed out through the open wire mesh sleeve closed section 51 at a location adjacent the tail end 31 of the protective sheath.

With the tail end 65 of the feed tube extending out the tail end 54 of the closed section 51, the fragile connector 22 is inserted into the tail end of the tube and is moved towards the lead end of the tube. There it will be stopped by the tapered lead end 62 as seen in FIG. 10 adjacent the tail end of the sheath.

Next, the feed tube is pulled completely out of the wire mesh sleeve, by axially compressing the sleeve, and off the fragile connector and cable as seen in FIG. 11, leaving the cable inside the closed section 51. Since the fragile connector is still adjacent the open tail end of the sheath 12, the fragile connector can easily be maneuvered into the sheath as seen in comparing FIGS. 11 and 12.

As seen in FIG. 12, the fragile connector 20 is completely maneuvered into the sheath and the split section 52 is wrapped around the fragile cable 20. The split section is now closed with the cable therein by means of lacing the series of loops 58 and 59 with lace 60.

Then, the sleeve, including the closed section 51 and the split section 52, is pulled longitudinally, i.e., axially, relative to the sheath to radially reduce the sleeve around the cable into a gripping engagement. This is shown in FIG. 13.

The embodiment shown in FIGS. 9-13 is advantageously used for cable having less than a three-sixteenth inch diameter and for cables and connectors where the connector size is beyond the expansion capability of the wire mesh sleeve that is made to suit the cable diameter.

While various advantageous embodiments have been chosen to illustrate the invention, it will be understood by those skilled in the art that various changes and modifications can be made therein without departing from the scope of the invention as defined in the appended claims.

What is claimed is:

1. A grip for pulling fragile cable having a fragile terminal end, the grip comprising:
   a hollow protective sheath having an inwardly tapering lead end and a tail end, said tail end being open for the reception of the fragile terminal end of the fragile cable therein,
   said sheath comprising an elongated wall of substantially circular cross-sectional shape providing an unobstructed elongated chamber of substantially cylindrical shape communicating with the open tail end,
   said wall having a smooth inner surface encasing the fragile terminal end of the cable inserted into said chamber, thereby protecting the fragile terminal end against external objects during pulling of the cable by the grip;
   a pulling device;
   means for coupling said pulling device to said lead end of said protective sheath;
   a wire mesh sleeve having a lead end and a tail end; and
   means for coupling said lead end of said wire mesh sleeve to said tail end of said protective sheath outside of said smooth inner surface, the fragile cable being receivable in and grippable by said wire mesh sleeve.

2. A grip according to claim 1, wherein:
said pulling device comprises a loop.

3. A grip according to claim 1, wherein:
said pulling device comprises a wire loop.

4. A grip according to claim 1, wherein:
said means for coupling said pulling device includes means for rotatably coupling said pulling device to said lead end of said protective sheath.

5. A grip according to claim 4, wherein:
said pulling device comprises a wire loop,
said lead end of said protective sheath is open, the two ends of said loop passing therethrough, and
said means for rotatably coupling comprises
   a lug rigidly coupled to the two ends of said wire loop, and
   a cavity defined in said protective sheath rotatably receiving said lug.

6. A grip according to claim 1, wherein:
said pulling device is flexible.

7. A grip according to claim 1, wherein:
said wire mesh sleeve is closed along its length.

8. A grip according to claim 1, wherein:
said wire mesh sleeve is split along its length.

9. A grip according to claim 8, wherein:
said wire mesh sleeve has a plurality of opposed loops defining the split, said loops being connected by lacing.

10. A grip according to claim 1, wherein:
said wire mesh sleeve is closed adjacent said lead end thereof and is split adjacent said tail end thereof.

11. A grip according to claim 8, wherein:
said lead end of said wire mesh sleeve is rigidly coupled to said tail end of said protective sheath.

12. A grip according to claim 1, wherein:
said lead end of said wire mesh sleeve is rigidly coupled to the exterior surface of said protective sheath.

13. A grip according to claim 1, wherein:
said means for rigidly coupling said lead end of said wire mesh sleeve to said protective sheath comprises a collar, said lead end of said wire mesh sleeve being interposed between said collar and said protective sheath.

14. A grip according to claim 1, wherein:
said protective sheath is rigid.

15. A grip according to claim 1, wherein:
said inwardly tapering lead end has a substantially smooth outer surface.

16. A grip according to claim 1, wherein:
said elongated wall has a substantially smooth outer surface.

17. A grip according to claim 1, wherein:
said protective sheath is substantially continuous to prevent external objects from passing into said elongated chamber.

18. A grip according to claim 17, wherein:
said inwardly tapering lead end has a substantially smooth outer surface, and
said elongated wall has a substantially smooth outer surface.

19. A cable grip comprising:
a tubular body portion of substantially circular cross-sectional shape having a forward end, a rearward end and a longitudinal axis, said body portion including a fully enclosed side wall having a smooth inner surface and elongated in a direction parallel to said longitudinal axis and enclosing an elongated, unobstructed chamber which opens toward the rearward end of said body portion;

a nose portion having an inwardly tapered end extending forwardly from said forward end of said body portion, said nose portion tapering toward said longitudinal axis from said forward end of said body portion to a draft end of the grip;

pulling means rotatably coupled to said draft end of the nose portion for permitting rotation of said nose portion about said longitudinal axis, and a mesh grip coupled to said rearward end of said tubular body portion outside of said smooth inner surface for gripping the cable, said chamber providing a completely protective enclosure for the free end of the cable inserted therein.

* * * * *